Jan. 18, 1927. 1,614,837
J. GOLDSTONE ET AL
ART OF ARTIFICIAL LIGHTING
Filed Oct. 2, 1923  2 Sheets-Sheet 1
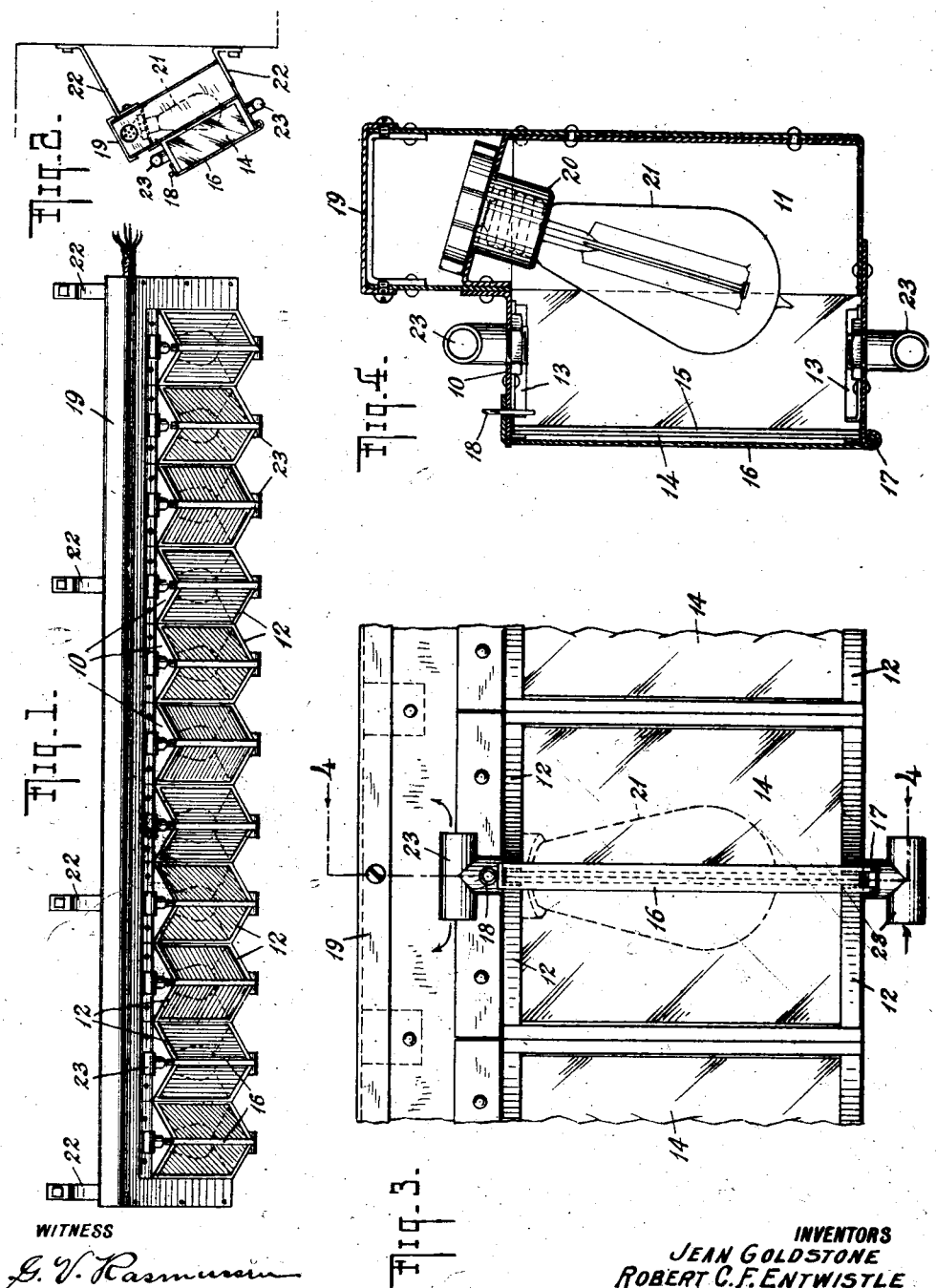
WITNESS
G. V. Rasmussen
INVENTORS
JEAN GOLDSTONE
ROBERT C. F. ENTWISTLE
BY
ATTORNEYS Jan. 18, 1927. 1,614,837
J. GOLDSTONE ET AL
ART OF ARTIFICIAL LIGHTING
Filed Oct. 2, 1923   2 Sheets-Sheet 2
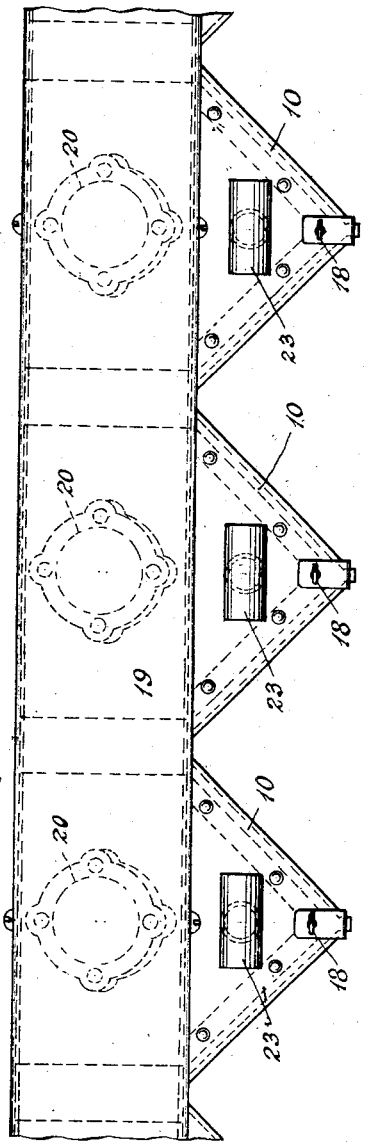
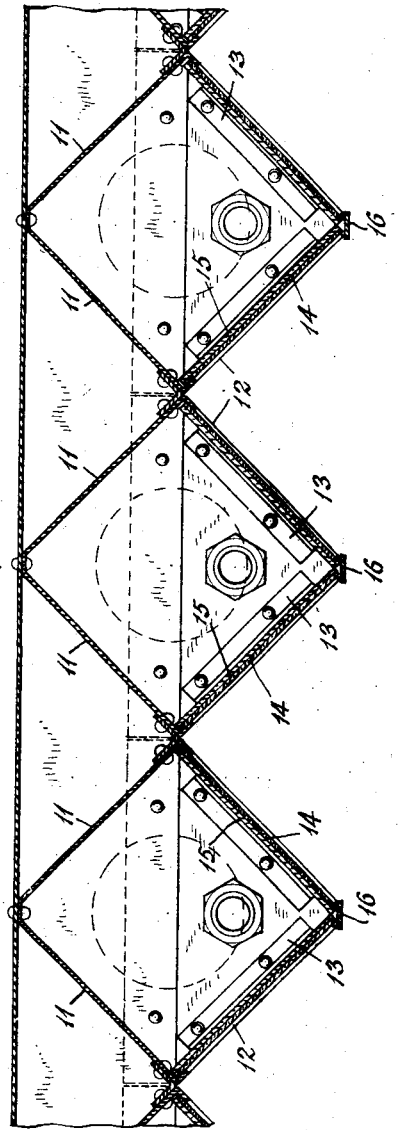
WITNESS
G. V. Rasmussen
INVENTORS
JEAN GOLDSTONE
ROBERT C. F. ENTWISTLE
BY
Biesen & Schrenk
ATTORNEYS Patented Jan. 18, 1927.

1,614,837

UNITED STATES PATENT OFFICE.

JEAN GOLDSTONE AND ROBERT C. F. ENTWISTLE, OF NEW YORK, N. Y.

ART OF ARTIFICIAL LIGHTING.

Application filed October 2, 1923. Serial No. 666,091.

Our invention relates to the artificial lighting of the stages of theatres, auditoriums and other places of performance as well as studios, show windows and other places of display, and has for its object to provide an efficient method whereby artificial lighting effects of predetermined and varied characteristics may be obtained in a simple and novel manner. A further object of the invention consists in the provision of a novel apparatus whereby the desired lighting effects are obtainable at will. Other more specific objects will appear from the description hereinafter.

In the accompanying drawings which show an example of the novel apparatus without defining the limits of the invention, Fig. 1 is an elevation of a strip light embodying the invention; Fig. 2 is an end view; Fig. 3 is an enlarged detail front view of the apparatus; Fig. 4 is a vertical section thereof on the line 4—4 of Fig. 3; Fig. 5 is an enlarged plan view and Fig. 6 is a horizontal section of the apparatus.

The novel method of producing lighting effects of varied and predetermined characteristics consists in projecting light rays through three primary colors arranged in predetermined fixed sequence, as, for instance, red, blue, and green or red, yellow and blue, and located adjacent to each other in the form of color transmitting plates and then varying the intensity of the lights, in any convenient manner as by suitable dimmers, to produce any color, tint or shade on the spectrum or any intermediate shades thereof which are visible to the eye or to produce a perfectly white light. The efficiency of the method resides in the utilization of three primary colors, red, blue, and green or red, yellow and blue, in the form of color transmitting plates of pure color, as a basis for obtaining the various color effects. In the preferred arrangement the color transmitting plates are located in sequential pairs in which the three colors appear in repeated succession.

The apparatus illustrated in the drawings, by way of example, for carrying out the method, consists of a box or chamber 10 of suitable material, preferably metal and preferably constructed in the form of a rectangle, in which the rear walls 11 constitute reflectors and the front walls comprise open frames 12. The upper and lower walls of the chamber 10 are provided with guides 13 for the reception of color transmitting plates 14 and 15 which are slidably fitted therein in registry with the frames 12 and held in place by a vertical strip 16 as shown in Figs. 3 and 4; the latter may be hinged at 17 to permit removal and replacement of the plates 14 and 15 and may be locked in its operative position in any convenient manner as by means of a cotter pin 18. The plates 14 are of pure color and are colored in accordance with the primary colors red, blue, and green or red, yellow and blue, while the plates 15 are frosted or constructed of a material which possesses the property of diffusing light rays, said plates 15 lying over the color plates 14 on the inside to protect the same; in some instances the incandescent bulb referred to hereinafter may be frosted in which case the frosted plates or their equivalent may be omitted. That is to say, the purpose of the diffusing media is to prevent objectionable shadows of the three colors when the foot, strip or border light is required to be within a certain range of that which is to be lighted. If on the other hand the foot, strip or border light in which the present system is installed may be located the proper distance from that which is to be lighted to avoid the creation of such objectionable colored shadows, the above mentioned diffusing media may be unnecessary. By colored shadows is meant a shadow cast by a lighted object, the edge of which shadow is fringed with a separation of colors which are insufficiently mixed at the source. For instance, the shadow of an object in a white light would be surrounded by a border of red, green and blue. Each box or chamber 10 contains two color plates 14 of one of the three given colors and two cover plates 15, the plates being set at an angle to each other calculated in accordance with the dimensions of the area to be lighted and its distance from the lighting system, and in parallel relation to the rear walls 11 as shown in Fig. 6. In practice a plurality of chambers 10 are located in contiguous fixed relation to each other, as shown in Fig. 1, to form the foot, strip or border light and are fixed in this relation in any convenient manner as by being combined with a continuous channelled member 19 of suitable construction and dimensions. The arrangement is such that the apices of the angles formed by the front walls 12 points toward that which is to be lighted, the plates 14 of adjacent chambers 10 diverging outwardly and lying parallel with the rear walls 11 as shown best in Fig. 6. Each chamber 10 is provided interiorly with a socket 20 forming part of an electric circuit and adapted to receive an incandescent bulb 21 in the well known way. Any suitable means for fixing the foot, strip or border lights consisting of the chamber 10 and their associated elements in their intended operative position, may be used, said means, as shown comprising suitably dimensioned brackets 22. If the character of the incandescent bulb 21 is such that the interior of the chambers 10 require ventilation, said chambers may be provided as shown with vent pipes 23 fixed in the bottom and top walls of the chambers and communicating with the interiors thereof, said pipes serving to create a circulation of air in the chambers; or, if this interior ventilation of the chamber is not required, the vent pipes may be omitted, it being understood that other equivalent devices may be substituted if desired.

In practice, as previously stated, a plurality of chambers 10 each complete in itself in the manner illustrated and described may be combined with each other in a row as illustrated in Figs. 1, 5 and 6. The arrangement is such that the three primary colors, red, blue and green, or red, yellow and blue, are grouped together in adjacent fixed relation to each other and occur in predetermined fixed sequence in repeated successive groups in the same relation throughout the plurality of chambers 10 comprising the lighting apparatus. It will be understood that each chamber which may be said to comprise a color box is separated from the next adjacent chambers 10 by light-proof members, the shape and dimensions of which depends upon the type of foot-lights, border-lights or strip-lights of which the chambers form a part; the arrangement of plates 14 and reflector walls 11 is such that the light rays passing through the plates of one chamber intersect and become mixed with the light rays which pass through the contiguous plates of adjacent chambers. By varying the intensity of the lights in accordance with any predetermined plan, any desired color, tint or shade of the spectrum or any intermediate shades thereof which are visible to the eye, are obtainable; by suitably controlling the bulbs 21 a perfectly white light is also obtainable. Because of the fact that the light rays emanating from the bulbs are passed through three primary colors, red, blue and green or red, yellow and blue, of absolute purity and arranged in the form of light pervious plates, it is possible to produce the most minute and gradual transformations from color to color and from one intermediate tint to another in a uniform and positive manner. Any desired lighting effects may thus be produced to a most natural degree. The system is capable of use to advantage upon all stages, in auditoriums, studios, stores, show windows and other places of display and wherever lighting effects varying in color, degree and intensity are desired.

Various changes in the specific form shown and described may be made within the scope of the claims without departing from the spirit of our invention.

We claim:—

1. An apparatus for producing artificial lighting effects comprising a plurality of opaque chambers arranged adjacent to each other in a row, controllable light-producing means in each of said chambers, a pair of color transmitting plates in each chamber colored in accordance with one of three predetermined primary colors and extending at angles to each other in each chamber, said plates being located in sequential pairs in which the three colors appear in repeated succession and means for controlling said lighting means to produce a predetermined combination of the colored light rays passing through said plates.

2. An apparatus for producing artificial lighting effects comprising a plurality of chambers separate from one another and arranged adjacent to each other in a row, controllable light-producing means in each of said chambers, a pair of color transmitting plates in each chamber colored in accordance with one of three predetermined primary colors and extending at angles to each other in each chamber and diverging outwardly with respect to the plates of adjacent chambers, said plates being located in sequential pairs in which the three colors appear in repeated succession and reflecting walls located in parallel relation to said light pervious plates in each chamber whereby the light rays passing through contiguous plates of adjacent chambers intersect each other.

In testimony whereof we have hereunto set our hands.

JEAN GOLDSTONE.
ROBERT C. F. ENTWISTLE.